United States Patent
Sugiyama

[19]

[11] Patent Number: 6,028,637
[45] Date of Patent: Feb. 22, 2000

[54] APPARATUS AND METHOD OF INTER-BLOCK PREDICTIVE CODING/DECODING AND STORAGE MEDIUM STORING CODED SIGNAL

[75] Inventor: Kenji Sugiyama, Yokosuka, Japan

[73] Assignee: Victor Company of Japan, Ltd., Yokohama, Japan

[21] Appl. No.: 08/962,349

[22] Filed: Oct. 31, 1997

[30] Foreign Application Priority Data

Oct. 31, 1996 [JP] Japan .................................... 8-307408

[51] Int. Cl.[7] ...................................................... H04N 7/34
[52] U.S. Cl. ......................... 348/411; 348/420; 348/421; 358/426
[58] Field of Search ..................................... 348/409, 411, 348/420, 421; 358/426, 261.2, 261.3; H04N 7/34

[56] References Cited

U.S. PATENT DOCUMENTS 5,262,878 11/1993 Esserman .................................. 358/453
5,815,636 9/1998 Fujii ......................................... 386/116

*Primary Examiner*—Howard Britton
*Attorney, Agent, or Firm*—Jacobson, Price, Holman & Stern, PLLC

[57] ABSTRACT

An inter-block predictive coding/decoding apparatus sequentially encodes/decodes blocks of a picture. A block distant from a coded block by a predetermined distance is independently coded. An interpolative predictive signal is produced from the coded block and the independently coded block with respect to each pixel of a block to be predicted that is interposed between the coded block and the independently coded block. The interpolative predictive signal is subtracted from each pixel signal of the block be predicted to obtain a predictive residual signal. The predictive residual signal is coded. A block distant from a decoded block by the predetermined distance is independently decoded. The decoded block is obtained by decoding the independently coded block and the coded predictive residual signal. An interpolative predictive signal is produced from the decoded block and the independently decoded block with respect to each pixel of a block to be predicted that is interposed between the decoded block and the independently decoded block. A predictive residual signal of the block to be decoded is decoded. And, the interpolative predictive signal is added to the predictive residual signal.

8 Claims, 7 Drawing Sheets

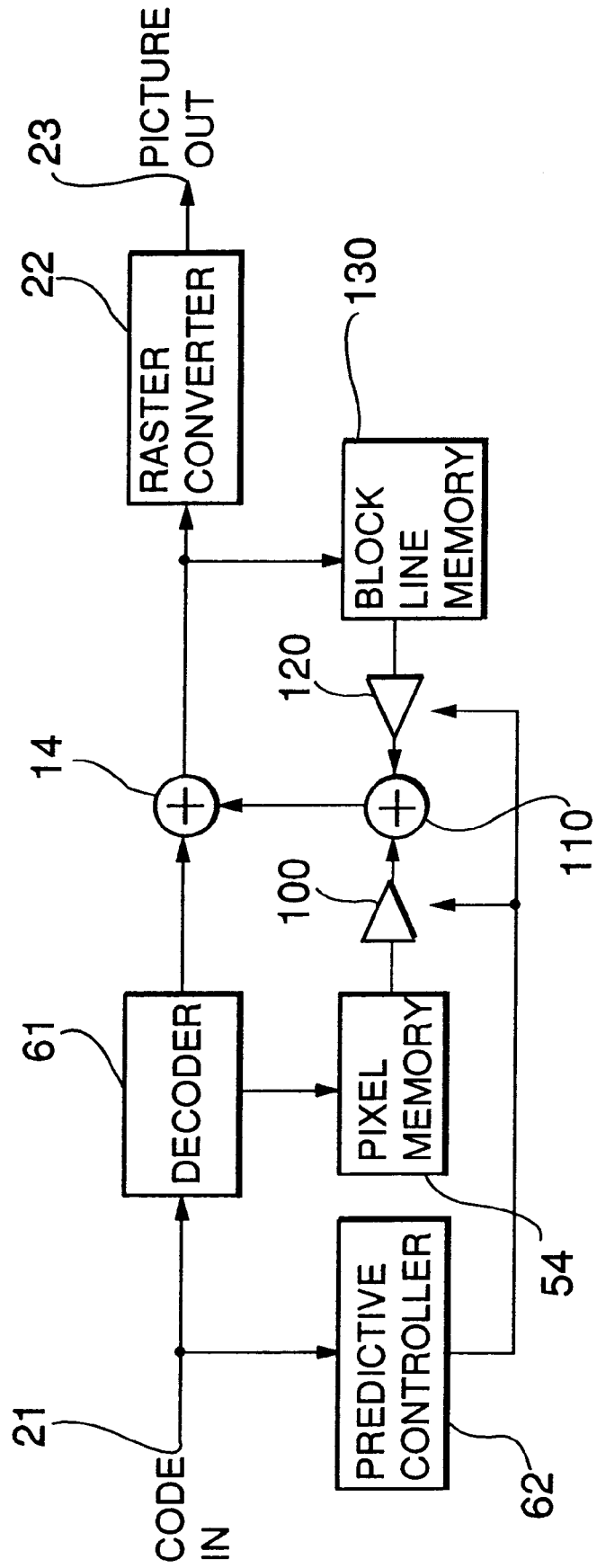

APPARATUS AND METHOD OF INTER-BLOCK PREDICTIVE CODING/DECODING AND STORAGE MEDIUM STORING CODED SIGNAL

BACKGROUND OF THE INVENTION

The present invention relates, in a high-efficiency coding for converting a picture into a digital signal with less code amount in order to transmit, store and display the picture efficiently, to the procedure particularly for coding a picture in block unit.

In the coding of pictures, the procedure for coding pictures in block unit using Discrete Cosine Transform (DCT) or the like has been most generally used.

There is a method for predicting pixels of a block to be coded from a coded block and for coding a predicted residue thereof, instead of coding blocks independently.

For example, refer to "High-Efficiency Coding of Pictures by Extrapolative Prediction—Discrete Sine Transform" described in the literature in Society of Electronic Information Communications (B), J71-No.6,pp. 717–724 (June 1988) and the like.

According to the literature, the coding processing is sequentially carried out in block unit, so that a coded block is present only on one side of a block to be coded. Accordingly, inter-block prediction is performed in one direction where a coded block is present. This prediction is called extrapolative prediction.

In the coding of a residual signal of the inter-block prediction, it is known that Discrete Sine Transform (DST) is higher than DCT in coding efficiency. This method employs inter-block correlation, so that the coding efficiency is better than intra-block coding. Further, in the inter-block prediction, predictive signals are obtained in a continuous signal value from an adjacent block to a block to be coded. Thus, even if the prediction residue is not completely coded, the continuity over blocks is improved and a block distortion is hard to occur.

However, as described above, the conventional inter-block prediction is performed using only one coded block presented one direction with respect to a block to be coded. In this case, the change of picture cannot be well predicted, and the coding efficiency is not sufficiently improved.

Further, the inter-block prediction is a cyclic prediction. Therefore, pictures will be damaged when a coding error occurs in a transmission line connecting an inter-block coding apparatus and a storage medium, an inter-block decoding apparatus, etc.

SUMMARY OF THE INVENTION

An object of the present invention is to provide an inter-block predictive coding/decoding apparatus and method by interpolative prediction whereby a coding error is not spread and the high coding efficiency is obtained.

Another object of the present invention is to provide a storage medium storing the coded signal obtained by the inter-block predictive coding/decoding apparatus and method by interpolative prediction.

The present invention provides an inter-block predictive coding apparatus for sequentially coding blocks of a picture, comprising: a first encoder to independently encode a block distant from a coded block by a predetermined distance; a predictor to produce an interpolative predictive signal from the coded block and the independently coded block with respect to each pixel of a block to be predicted that is interposed between the coded block and the independently coded block; a predictive subtracter to subtract the interpolative predictive signal from each pixel signal of the block be predicted to obtain a predictive residual signal; and a second encoder to encode the predictive residual signal.

Further, the present invention provides an inter-block predictive decoding apparatus for sequentially decoding blocks of a picture, comprising: a first decoder to independently decode a block distant from a decoded block by a predetermined distance; a predictor to produce an interpolative predictive signal from the decoded block and the independently decoded block with respect to each pixel of a block to be predicted that is interposed between the decoded block and the independently decoded block; a second decoder to decode a predictive residual signal of the block to be decoded; and a predictive adder to add the interpolative predictive signal to the predictive residual signal.

Further, the present invention provides an inter-block predictive coding apparatus for sequentially coding blocks of a picture, comprising: a first encoder to independently encode a pixel distant from a coded block; a predictor to produce an interpolative predictive signal from the coded block and the independently coded pixel with respect to each pixel of a block to be coded that is interposed between the coded block and the independently coded pixel; a predictive subtracter to subtract the interpolative predictive signal from each pixel of the block to be predicted to obtain a predictive residual signal; and a second encoder to encode the predictive residual signal.

Further, the present invention provides an inter-block predictive decoding apparatus for sequentially decoding blocks of a picture, comprising: a first decoder to independently decode a pixel distant from a decoded block by a predetermined distance; a predictor to produce an interpolative predictive signal from the decoded block and the independently decoded pixel with respect to each pixel of a block to be predicted that is interposed between the decoded block and the independently decoded pixel; a second decoder to decode a predictive residual signal of the block to be decoded; and a predictive adder to add the interpolative predictive signal to the predictive residual signal.

Further, the present invention provides an inter-block predictive coding method of sequentially coding blocks of a picture, comprising the steps of: independently encoding a block distant from a coded block by a predetermined distance; producing an interpolative predictive signal from the coded block and the independently coded block with respect to each pixel of a block to be predicted that is interposed between the coded block and the independently coded block; subtracting the interpolative predictive signal from each pixel signal of the block be predicted to obtain a predictive residual signal; and encoding the predictive residual signal.

Further, the present invention provides an inter-block predictive decoding method of sequentially decoding blocks of a picture, comprising the steps of: independently decoding a block distant from a decoded block by a predetermined distance; producing an interpolative predictive signal from the decoded block and the independently decoded block with respect to each pixel of a block to be predicted that is interposed between the decoded block and the independently decoded block; decoding a predictive residual signal of the block to be decoded; and adding the interpolative predictive signal to the predictive residual signal.

Further, the present invention provides a storage medium storing a coded signal obtained with inter-block predictive coding of sequentially encoding blocks of a picture by independently encoding a block distant from a coded block by a predetermined distance, producing an interpolative predictive signal from the coded block and the independently coded block with respect to each pixel of a block to be predicted that is interposed between the coded block and the independently coded block, subtracting the interpolative predictive signal from each pixel signal of the block be predicted to obtain a predictive residual signal and encoding the predictive residual signal to obtain the coded signal.

Further, the present invention provides an inter-block predictive coding and decoding apparatus for sequentially coding and decoding blocks of a picture, comprising: a first encoder to independently encode a block distant from a coded block by a predetermined distance; a first predictor to produce an interpolative predictive signal from the coded block and the independently coded block with respect to each pixel of a block to be predicted that is interposed between the coded block and the independently coded block; a predictive subtracter to subtract the interpolative predictive signal from each pixel signal of the block be predicted to obtain a predictive residual signal; a second encoder to encode the predictive residual signal; a first decoder to independently decode a block distant from a decoded block by the predetermined distance, the decoded block being obtained by decoding the independently coded block and the coded predictive residual signal; a second predictor to produce an interpolative predictive signal from the decoded block and the independently decoded block with respect to each pixel of a block to be predicted that is interposed between the decoded block and the independently decoded block; a second decoder to decode a predictive residual signal of the block to be decoded; and a predictive adder to add the interpolative predictive signal to the predictive residual signal.

BRIEF DESCRIPTION OF THE DRAWINGS

FIG. 7 shows a block diagram of a second embodiment of an inter-block predictive decoding apparatus according to the present invention.

DETAILED DESCRIPTION OF THE PREFERRED EMBODIMENTS

Figure 1:
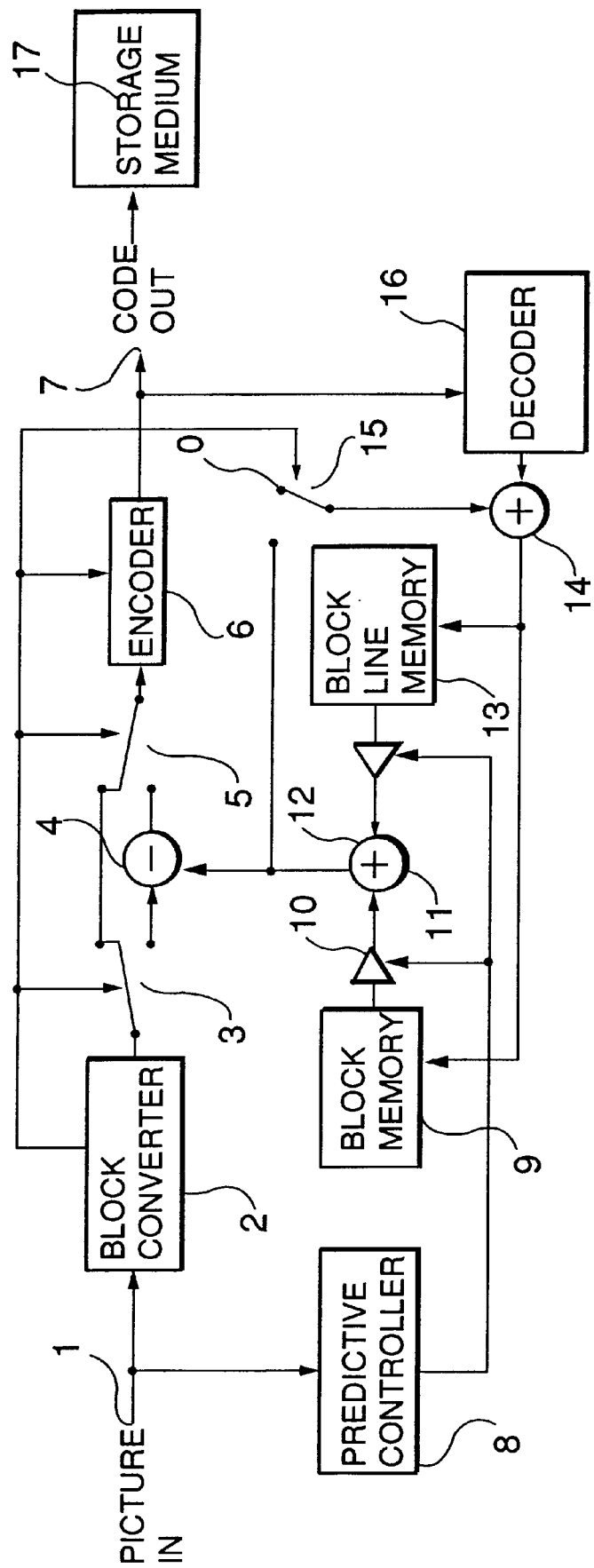
FIG. 1 shows a block diagram of a first embodiment of an inter-block predictive coding apparatus according to the present invention.

FIG. 1 shows a block diagram of a first embodiment of an inter-block predictive coding apparatus according to the present invention.

A raster-scanned image (picture) signal supplied via input terminal 1 is supplied to a block converter 2 that converts the image signal into an image signal in block unit. The input image signal is also supplied to a predictive controller 8 which will be described later.

Figure 2A:
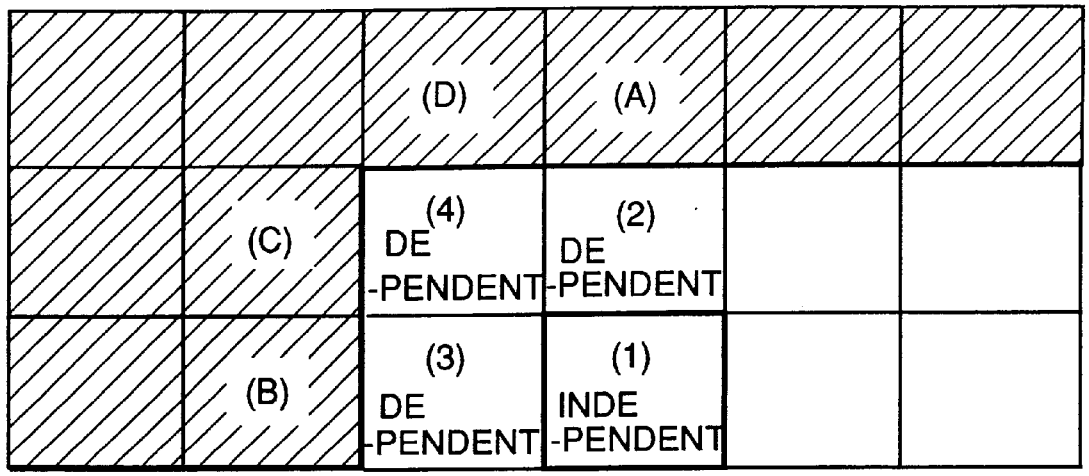
FIGS. 2A to 2C are views showing the behavior of processing of the first embodiment according to the present invention.

The order of converting the image signal into blocks by the block converter 2 is shown FIG. 2A. More in detail, four blocks are output from the block converter 2 as one block group (2×2 block matrix) in the order of an independent block (1), a dependent block (2), a dependent block (3) and a dependent block (4) as shown in FIG. 2A.

This block output order is a feature of the present invention, however, the processing per four blocks is a well known method for a luminance signal in the coding where the image format is of 4:2:0 type.

The block converter 2 further outputs control signals for controlling switches 3, 5 and 15 in accordance with the block output order.

The converted image signal is then supplied to the switch 3. By one of the control signals, the switch 3 is connected to the switch 5 for transmitting the independent block (1) thereto and a predictive subtracter 4 for transmitting the predictive blocks (2), (3) and (4) thereto.

The image signal of each dependent block is supplied to the predictive subtracter 4 that subtracts an interpolative predictive signal from the image signal to produce a predictive residual signal. The predictive residual signal is supplied to the switch 5. The interpolative predictive signal is supplied from an adder 11 as described later.

The switch 5 is controlled as synchronized with the switch 3 to transmit the image signal of the independent block (1) to an encoder 6 as it is, while the predictive residual signal thereto in case of the dependent blocks (2) to (4).

The encoder 6 performs variable-length coding with DCT processing and quantization to each block to produce compressed coded signal. Instead of the DCT transform processing, the encoder 6 can perform DST processing to the dependent blocks. Further, since the dependent blocks have few direct current (DC) components, the same processing as that to alternate current (AC) components of the dependent blocks can be applied to the DC components in the variable-length coding.

The coded signal is output via output terminal 7 and stored in a storage medium 17, such as a disc like-storage medium.

The coded signal is further supplied to a decoder 16. The decoder 16 performs the reverse processing of the encoder 6 to the coded signal to reproduce the image signal in case of the independent block (1) while the predictive residual signal in case of the dependent blocks (2) to (4). Each reproduced signal is supplied to a predictive adder 14.

By one of the control signals from the block converter 2, the switch 15 connects the adder 11 and the predictive adder 14 in case of the dependent blocks (2) to (4). The interpolative predictive signal is supplied from the adder 11 to the predictive adder 14. The predictive adder 14 adds the interpolative predictive signal and the predictive residual signal to reproduce the image signal. On the other hand, in case of the independent block (1), the switch 15 does not connect the adder 11 and the predictive adder 14. The image signal reproduced by the decoder 16 then passes through the predictive adder 14 with no addition.

The reproduced image signal of dependent block is supplied only to a block line memory 13. On the other hand the reproduced image signal of independent block is supplied to the block line memory 13 and also to a block memory 9. The memories 9 and 13 are controlled in accordance with block numbers attached to the blocks to store the image signal as described above.

The block line memory 13 stores and holds the image signal until the next image signal of independent block is supplied thereto. The block line memory 13 basically stores a portion of reproduced image signal from right to left of a picture (block line) in block unit. The block line memory 13 stores and holds double in maximum the image signal of block unit compared to the conventional method. In this embodiment, however, since the pixels present at the ends of each block are used in prediction, the block line memory 13 stores those pixels only.

The block memory 9 and the block line memory 13 respectively output the image signals of pixels present at the ends of blocks adjacent to a block used in prediction.

The image signals from the memories 9 and 13 are respectively supplied to multipliers 10 and 12 where the image signals are multiplied by coefficients K and (1−K), respectively, and supplied to the adder 11. The adder 11 adds the image signals to produce the interpolative predictive signal.

Figure 3:
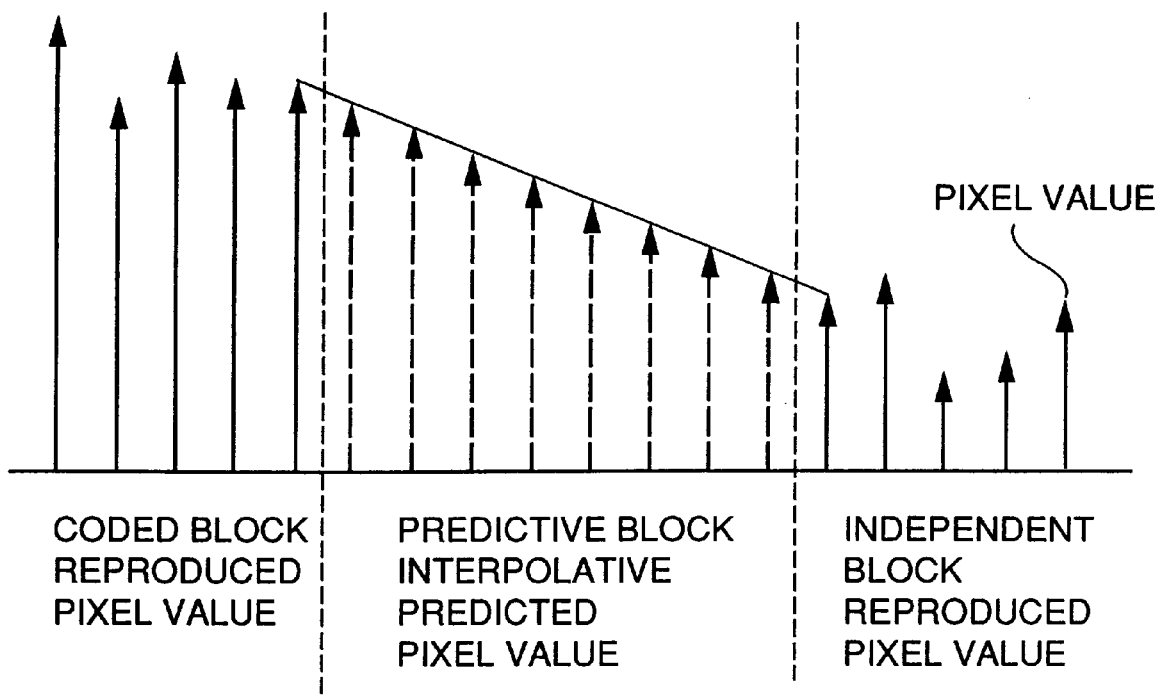
FIG. 3 is a view showing the behavior of the interpolative prediction according to the present invention.

The coefficients are supplied by the predictive controller 8 and decided in accordance with locations of pixels in block of the input image signal. An actual prediction method is a linear prediction as shown in FIG. 3 where K is in the range of 1/9 and 8/9 in accordance with the positional relationship between pixels to be predicted and to be referred to.

The interpolative predictive signal thus produced is supplied to the predictive subtracter 4 and the switch 15.

The inter-block predictive coding according to the present invention will be described with reference to FIGS. 2A to 2C. In the drawings, each box with oblique lines indicates a block already reproduced and without the oblique lines a block to be predictive-coded.

Figure 2B:
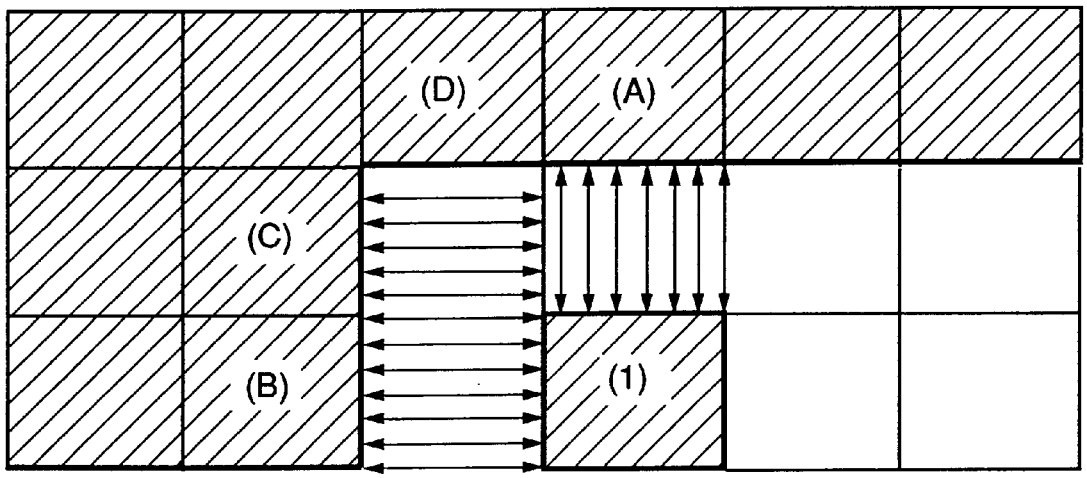

When predicting the dependent block (2), as shown in FIG. 2B, the independent block (1) is already coded and reproduced. Thus, there are reproduced blocks (A) and (1) present up and down with respect to the predictive (dependent) block (2). The predictive block (2) is thus predicted by linear interpolative prediction using pixels of the blocks (A) and (1), the pixels being present adjacent to the predictive block (2).

Next, the dependent block (3) is predicted. As shown in FIG. 2B, there are reproduced blocks (B) and (1) present left and right with respect to the predictive (dependent) block (3). The predictive block (3) is thus predicted by linear interpolative prediction using pixels of the blocks (B) and (1), the pixels being present adjacent to the predictive block (3).

In case of the predictive (dependent) block (4), there are reproduced blocks (C) and (D) present left and up with respect to the block (4) in FIG. 2B. That is, there is no block by which the predictive block (4) is interposed. The predictive block (4) is thus predicted in left and right directions using a predictive value of the predictive block (2) as shown in FIG. 2B. This corresponds to a prediction method using the independent block (1) indirectly. A predictive value of the predictive block (3) may be used instead of the predictive block (2).

Figure 2C:
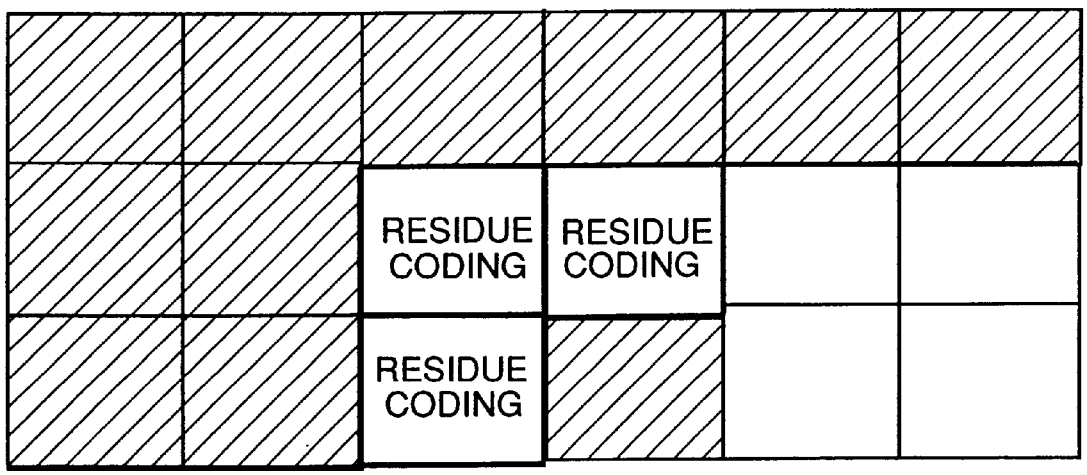

The predictive residue signals of the dependent blocks (2) to (4) thus predicted are coded by the encoder 6 as shown in FIG. 2C.

Figure 4:
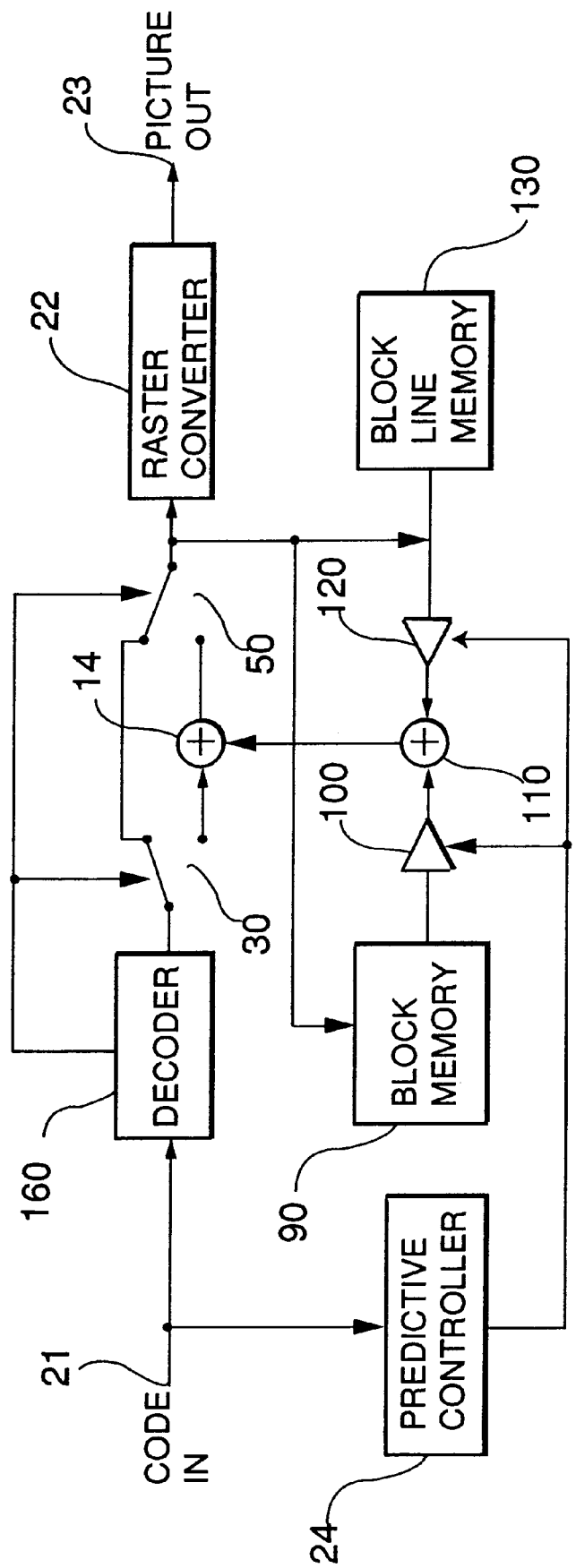
FIG. 4 shows a block diagram of a first embodiment of an inter-block predictive decoding apparatus according to the present invention.

Next, FIG. 4 shows a block diagram of a first embodiment of an inter-block predictive decoding apparatus according to the present invention.

The compressed coded signal output from the coding apparatus of FIG. 1 is stored in the storage medium 17, such as a disc-like storage medium.

The coded signal, for example, reproduced from the storage medium 17 is supplied to a decoder 160 via input terminal 21. The coded signal is also supplied to a predictive controller 24 which will be described later.

The decoder 160 performs the reverse processing of the encoder 6 of the coding apparatus shown in FIG. 1 to reproduce the image signal of the independent block (1) or the predictive residual signal of the dependent block (2), (3) or (4).

The decoder 160 further outputs control signals for controlling switches 30 and 50 in accordance with the block input order.

The reproduced signal is then supplied to the switch 30. By one of the control signals, the switch 30 is connected to the switch 50 for transmitting the reproduced image signal of the independent block (1) thereto while a predictive adder 14 for transmitting the reproduced predictive residual signal of the predictive blocks (2), (3) and (4) to a predictive adder 14.

The predictive adder 14 adds an interpolative predictive signal from an adder 110 and the reproduced predictive residue signal to reproduce the image signal. The reproduced image signal is supplied to the switch 50.

The switch 50 is controlled as synchronized with the switch 30 to transmit the image signal of the independent block (1) to a raster converter 22 as it is, while the output signal of the predictive adder 14 in case of the dependent blocks (2) to (4).

The image signal of each dependent block is supplied only to a block line memory 130. On the other hand, the image signal of the independent block is supplied to the block line memory 130 and also to a block memory 90. The memories 90 and 130 are controlled in accordance with block numbers attached to the blocks to store the image signal as described above.

The same as the block line memory 13 of FIG. 1, the block line memory 130 stores and holds the image signal until the next image signal of independent block is supplied thereto. The block line memory 130 basically stores a portion of reproduced image signal from right to left of a picture (block line) in block unit. The memory 130 stores and holds double in maximum the image signal of block unit compared to the conventional method. In this embodiment, since the pixels present at the ends of each block are used in prediction, the block line memory 130 stores those pixels only.

The block memory 90 and the block line memory 130 respectively output the image signals of pixels present at the ends of blocks adjacent to a block used in prediction.

The image signals from the memories 90 and 130 are respectively supplied to multipliers 100 and 120 where the image signals are multiplied by the coefficients K and (1−K), respectively, the same as those used in the coding apparatus of FIG. 1 and supplied to the adder 110. The adder 110 adds the image signals to produce the interpolative predictive signal.

The coefficients are supplied by the predictive controller 24 and decided in accordance with locations of pixels in block of the input coded signal. An actual prediction method here is also the linear prediction as shown in FIG. 3.

The interpolative predictive signal thus produced is supplied to the predictive adder 14 for inter-block prediction as describe above.

The coding apparatus and the decoding apparatus described above as with reference to FIGS. 1 and 2 can be integrated.

Further, the apparatus can be constructed compactly for potable use with a disc player, for instance. In this case, image signals stored on a disk-like storage medium can be decoded and reproduced promptly anywhere.

Figure 5:
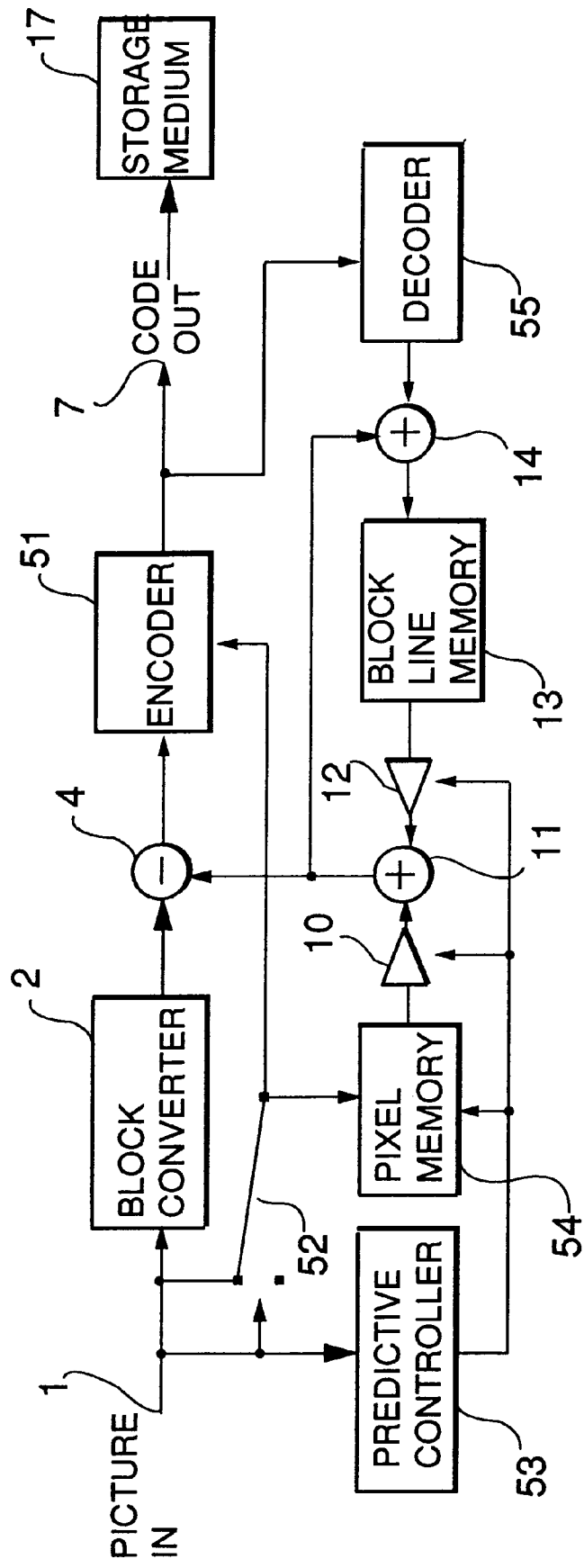
FIG. 5 shows a block diagram of a second embodiment of an inter-block predictive coding apparatus according to the present invention.

Next, FIG. 5 shows a block diagram of a second embodiment of an inter-block predictive coding apparatus according to the present invention.

In FIG. 5, elements with the same functions of those of the first embodiment shown in FIG. 1 are indicated by the same reference numerals.

A difference from the first embodiment in processing is that in the first embodiment, the object for independent coding is one block whereas in this embodiment, only one pixel is handled.

A raster-scanned image signal is supplied to a block converter 2 via input terminal 1. Further, an independent pixel of the image signal is supplied to a pixel memory 54 and an encoder 51.

An output signal of the block converter 2 is supplied to a predictive subtracter 4 where an interpolative predictive signal from an adder 11 is subtracted from the output signal to produce a predictive residue signal.

The predictive residue signal is supplied to an encoder 51. An output signal of the encoder 51 is stored, for example, in a disk-like storage medium 17 via output terminal 7.

The encoder 51 performs DST processing to the predictive residue signal to produce transform coefficients and quantize the transform coefficients to produce a coded signal. The encoder 51 also encodes an independent pixel and multiplexes information thereof with the predictive residue signal. However, since the coded independent pixel has its pixel value as it is, this is a mere multiplexing.

An decoder 55 performs the reverse processing of the encoder 51 to the coded signal therefrom to reproduce the predictive residue signal.

A predictive controller 53 decides one independent pixel per four blocks, which is a pixel located farthest from a coded block to control the switch 52. The independent pixel is supplied to a pixel memory 54 via switch 52. The pixel memory 54 stores the independent pixel and holds it for a period of prediction processing of one predicative block.

Figure 6:
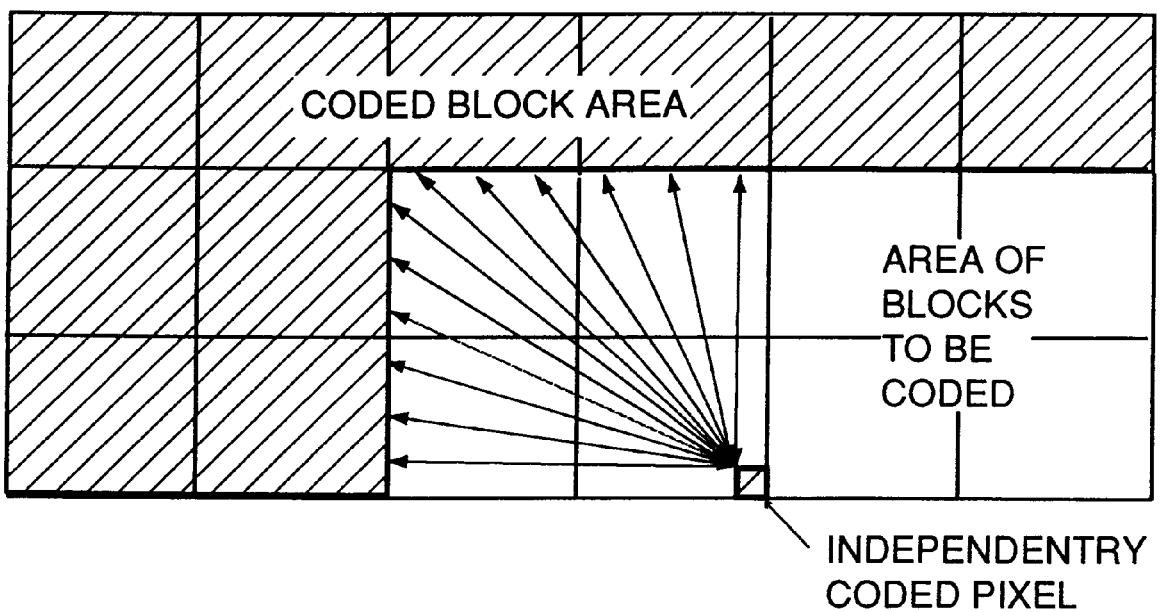
FIG. 6 is a view showing the behavior of processing according to the second embodiment of the present invention.

A predictive signal is produced by linear prediction performed between a pixel of a coded block, the pixel being adjacent to a predictive block and the independent pixel as shown in FIG. 6. The predictive controller 53 controls the multipliers 10 and 12, the adder 11 and the pixel memory 54 for interpolative prediction in accordance with the positional relationship between the predictive signal, the independent pixel and the pixels of coded blocks adjacent to predictive blocks.

A block including the independent pixel is also a predictive block, so that this block is applied with the inter-block prediction the same as other predictive blocks. The independent pixel is handled similarly to other pixels as a pixel of a predictive residue zero.

By the above-described processing, four blocks will be predictive blocks, which increases a rate of prediction as compared with the first embodiment. However, the distance between blocks for the linear prediction is about twice compared with the first embodiment.

In the case of the second embodiment, it is not always necessary that the processing be 4-block unit, but one block unit may be employed. All the blocks are processed as predictive blocks including an independent pixel.

Next, FIG. 7 shows a block diagram of a second embodiment of an inter-block predictive decoding apparatus according to the present invention.

In FIG. 7, elements with the same functions as those of the first embodiment shown in FIG. 4 are indicated by the same reference numerals.

The compressed coded signal output from the coding apparatus of FIG. 5 is stored in the storage medium 17, such as a disc-like storage medium.

The coded predictive residual signal, for example, reproduced from the storage medium 17 is supplied to a decoder 61 via input terminal 21 and then supplied to a predictive adder 14. The coded independent pixel signal also reproduced from the storage medium 17 is decoded by the decoder 61 and supplied to a pixel memory 54.

The predictive adder 14 adds the predicative residual signal and an interpolative predictive signal from an adder 110 to reproduce the image signal. The reproduced image signal is supplied to a raster converter 22 and converted into a raster-scanned image signal. The raster-scanned image signal is cutput from the decoding apparatus via output terminal 23.

The interpolative predictive signal is reproduced the same way as the coding apparatus of FIG. 5 by the pixel memory 54, the multipliers 100 and 120, the adder 110 and the line block memory 130.

The operation of the predictive controller 62 is also fundamentally the same as the predictive controller 53 of the coding apparatus of FIG. 5 but control is made on the basis of the input code.

The coding apparatus and the decoding apparatus described above with reference to FIGS. 5 and 7 can also be integrated.

Further, the apparatus can be constructed compactly for portable use with a disc player, for instance. In this case, image signals stored on a disk-like storage medium can be decoded promptly anywhere.

As described above, in the present invention, a block or pixel freed from a coded block is independently coded, and a block interposed between the independently coded block or pixel and the coded block is subjected to interpolative prediction by the coded block and the block or pixel freed therefrom, and the residue is coded.

The interposed block is subjected to the interpolative prediction, thus improving the prediction efficiency. The code amount generated by the coding apparatus is thus reduced and the coding efficiency is improved.

The present invention employs the inter-block prediction, however, even if a code error occurs, it stops at a block adjacent to a predictive block, and a problem in which the reproduced quality is affected by the error in a transmission line is lessened.

In a portion where a picture gradually changes, such as a vacant portion of a picture pattern, the interpolative prediction becomes precise, so that predictive errors are extremely reduced.

In this case, since the predictive block is not coded, a quantization distortion per block generated by roughly coding a prediction error is removed, and a block distortion of a reproduced picture is relieved.

What is claimed is:

1. An inter-block predictive coding apparatus for sequentially coding blocks of a picture, comprising:

a first encoder to independently encode a block distant from a coded block by a predetermined distance;

a predictor to produce an interpolative predictive signal from the coded block and the independently coded block with respect to each pixel of a block to be predicted that is interposed between the coded block and the independently coded block;

a predictive subtracter to subtract the interpolative predictive signal from each pixel signal of the block be predicted to obtain a predictive residual signal; and a second encoder to encode the predictive residual signal.

2. An inter-block predictive decoding apparatus for sequentially decoding blocks of a picture, comprising:

a first decoder to independently decode a block distant from a decoded block by a predetermined distance;

a predictor to produce an interpolative predictive signal from the decoded block and the independently decoded block with respect to each pixel of a block to be predicted that is interposed between the decoded block and the independently decoded block;

a second decoder to decode a predictive residual signal of the block to be decoded; and a predictive adder to add the interpolative predictive signal to the predictive residual signal.

3. An inter-block predictive coding apparatus for sequentially coding blocks of a picture, comprising:

a first encoder to independently encode a pixel distant from a coded block;

a predictor to produce an interpolative predictive signal from the coded block and the independently coded pixel with respect to each pixel of a block to be coded that is interposed between the coded block and the independently coded pixel;

a predictive subtracter to subtract the interpolative predictive signal from each pixel of the block to be predicted to obtain a predictive residual signal; and a second encoder to encode the predictive residual signal.

4. An inter-block predictive decoding apparatus for sequentially decoding blocks of a picture, comprising:

a first decoder to independently decode a pixel distant from a decoded block by a predetermined distance;

a predictor to produce an interpolative predictive signal from the decoded block and the independently decoded pixel with respect to each pixel of a block to be predicted that is interposed between the decoded block and the independently decoded pixel;

a second decoder to decode a predictive residual signal of the block to be decoded; and a predictive adder to add the interpolative predictive signal to the predictive residual signal.

5. An inter-block predictive coding method of sequentially coding blocks of a picture, comprising the steps of:

independently encoding a block distant from a coded block by a predetermined distance;

producing an interpolative predictive signal from the coded block and the independently coded block with respect to each pixel of a block to be predicted that is interposed between the coded block and the independently coded block;

subtracting the interpolative predictive signal from each pixel signal of the block be predicted to obtain a predictive residual signal; and encoding the predictive residual signal.

6. An inter-block predictive decoding method of sequentially decoding blocks of a picture, comprising the steps of:

independently decoding a block distant from a decoded block by a predetermined distance;

producing an interpolative predictive signal from the decoded block and the independently decoded block with respect to each pixel of a block to be predicted that is interposed between the decoded block and the independently decoded block;

decoding a predictive residual signal of the block to be decoded; and adding the interpolative predictive signal to the predictive residual signal.

7. A storage medium storing a coded signal obtained with inter-block predictive coding of sequentially encoding blocks of a picture by independently encoding a block distant from a coded block by a predetermined distance, producing an interpolative predictive signal from the coded block and the independently coded block with respect to each pixel of a block to be predicted that is interposed between the coded block and the independently coded block, subtracting the interpolative predictive signal from each pixel signal of the block be predicted to obtain a predictive residual signal and encoding the predictive residual signal to obtain the coded signal.

8. An inter-block predictive coding and decoding apparatus for sequentially coding and decoding blocks of a picture, comprising:

a first encoder to independently encode a block distant from a coded block by a predetermined distance;

a first predictor to produce an interpolative predictive signal from the coded block and the independently coded block with respect to each pixel of a block to be predicted that is interposed between the coded block and the independently coded block;

a predictive subtracter to subtract the interpolative predictive signal from each pixel signal of the block be predicted to obtain a predictive residual signal;

a second encoder to encode the predictive residual signal;

a first decoder to independently decode a block distant from a decoded block by the predetermined distance, the decoded block being obtained by decoding the independently coded block and the coded predictive residual signal;

a second predictor to produce an interpolative predictive signal from the decoded block and the independently decoded block with respect to each pixel of a block to be predicted that is interposed between the decoded block and the independently decoded block;

a second decoder to decode a predictive residual signal of the block to be decoded; and a predictive adder to add the interpolative predictive signal to the predictive residual signal.

* * * * *